US012602718B2

(12) United States Patent
Bhattacharjee

(10) Patent No.: US 12,602,718 B2
(45) Date of Patent: Apr. 14, 2026

(54) SUBSCRIBER-BASED REAL-TIME SERVICE PROVIDER OFFERINGS

(71) Applicant: Charter Communications Operating, LLC, St. Louis, MO (US)

(72) Inventor: Kaushik Bhattacharjee, Highlands Ranch, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 129 days.

(21) Appl. No.: 18/432,997

(22) Filed: Feb. 5, 2024

(65) Prior Publication Data

US 2025/0252476 A1    Aug. 7, 2025

(51) Int. Cl.
*G06Q 30/00* (2023.01)
*G06Q 30/0601* (2023.01)
*G06Q 50/50* (2024.01)

(52) U.S. Cl.
CPC ......... *G06Q 30/0631* (2013.01); *G06Q 50/50* (2024.01)

(58) Field of Classification Search
CPC ............................................... G06Q 30/06–08
See application file for complete search history.

(56) References Cited

U.S. PATENT DOCUMENTS

| | | | | |
|---|---|---|---|---|
| 8,306,518 | B1* | 11/2012 | Gailloux | H04W 12/04 |
| | | | | 455/418 |
| 9,219,790 | B1* | 12/2015 | Filev | H04L 67/535 |
| 9,686,420 | B2* | 6/2017 | Jahr | H04M 15/85 |
| 2007/0202845 | A1* | 8/2007 | Hutcheson | G06Q 30/04 |
| | | | | 455/405 |
| 2011/0244826 | A1* | 10/2011 | Krishnan | H04M 15/854 |
| | | | | 455/405 |
| 2013/0325667 | A1* | 12/2013 | Satyavolu | G06Q 30/0629 |
| | | | | 705/26.64 |

* cited by examiner

*Primary Examiner* — Ethan D Civan
(74) *Attorney, Agent, or Firm* — Dority & Manning, P.A.

(57) ABSTRACT

It is determined that a device associated with a subscriber is accessing an online system of a service provider. Data usage information associated with the subscriber as accessed. Based on the data usage information, an offering from a plurality of offerings is selected, the offering including a service offering or a product offering. Information that identifies the offering is caused to be sent to the device for display.

7 Claims, 3 Drawing Sheets

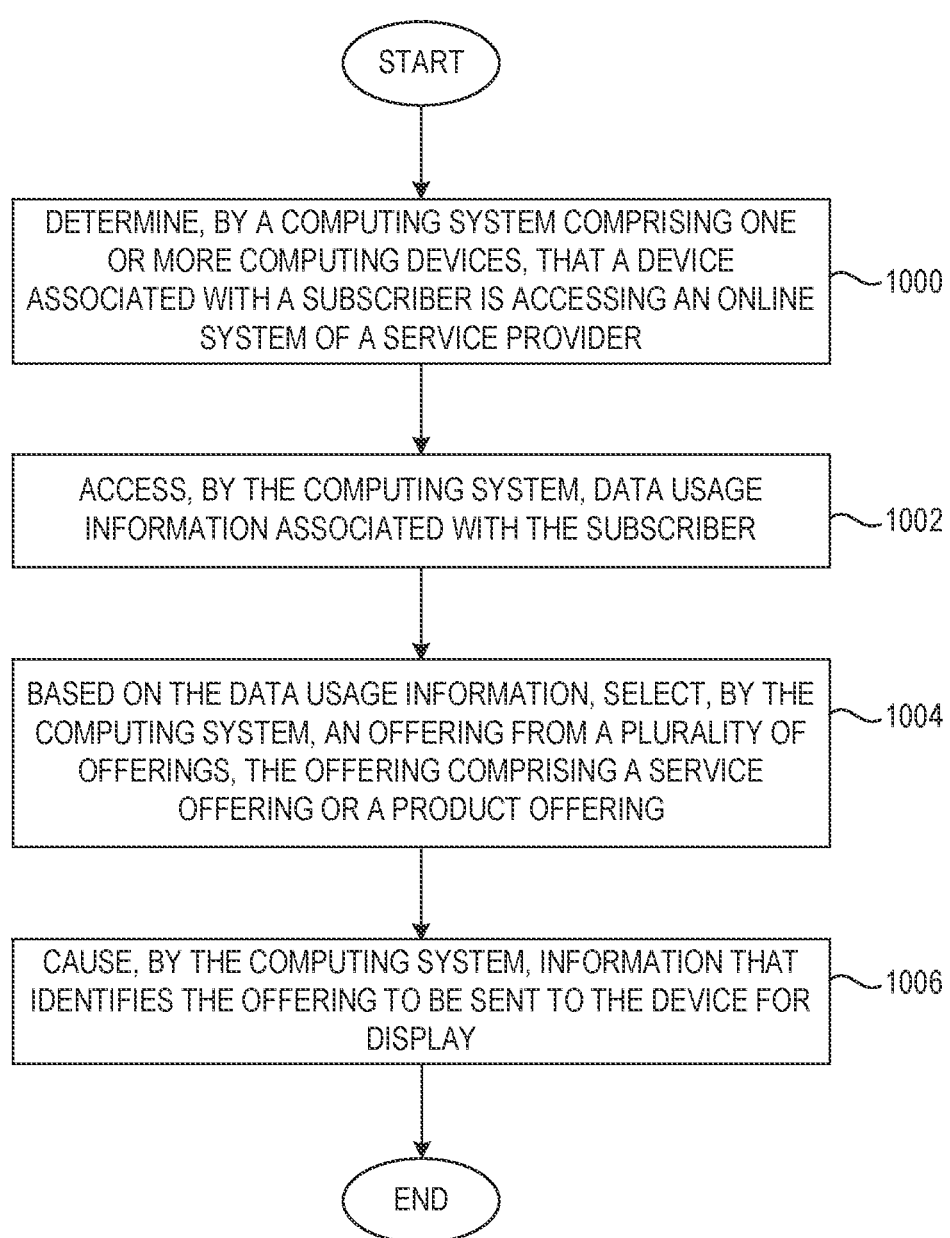

START

DETERMINE, BY A COMPUTING SYSTEM COMPRISING ONE OR MORE COMPUTING DEVICES, THAT A DEVICE ASSOCIATED WITH A SUBSCRIBER IS ACCESSING AN ONLINE SYSTEM OF A SERVICE PROVIDER   ~1000

ACCESS, BY THE COMPUTING SYSTEM, DATA USAGE INFORMATION ASSOCIATED WITH THE SUBSCRIBER   ~1002

BASED ON THE DATA USAGE INFORMATION, SELECT, BY THE COMPUTING SYSTEM, AN OFFERING FROM A PLURALITY OF OFFERINGS, THE OFFERING COMPRISING A SERVICE OFFERING OR A PRODUCT OFFERING   ~1004

CAUSE, BY THE COMPUTING SYSTEM, INFORMATION THAT IDENTIFIES THE OFFERING TO BE SENT TO THE DEVICE FOR DISPLAY   ~1006

END

*FIG. 2*

SUBSCRIBER-BASED REAL-TIME SERVICE PROVIDER OFFERINGS

BACKGROUND

Many individuals are not technically savvy and purchase a technology-based product, such as a smartphone or a Wi-Fi® router, or a technology-based service, such as Internet access service or cellular access service, based on a limited understanding of the purchase.

SUMMARY

The examples disclosed herein implement subscriber-based real-time service provider offerings.

In one implementation a method is provided. The method includes determining, by a computing system comprising one or more computing devices, that a device associated with a subscriber is accessing an online system of a service provider. The method further includes accessing, by the computing system, data usage information associated with the subscriber. The method further includes, based on the data usage information, selecting, by the computing system, an offering from a plurality of offerings, the offering comprising a service offering or a product offering. The method further includes causing, by the computing system, information that identifies the offering to be sent to the device for display.

In another implementation a computing system is provided. The computing system includes one or more computing devices operable to determine that a device associated with a subscriber is accessing an online system of a service provider. The one or more computing devices are further operable to access data usage information associated with the subscriber. The one or more computing devices are further operable to, based on the data usage information, select an offering from a plurality of offerings, the offering comprising a service offering or a product offering. The one or more computing devices are further operable to cause information that identifies the offering to be sent to the device for display.

In another implementation a non-transitory computer-readable storage medium is provided. The non-transitory computer-readable storage medium includes executable instructions operable to cause one or more computing devices to determine that a device associated with a subscriber is accessing an online system of a service provider. The instructions are further operable to cause the one or more computing devices to access data usage information associated with the subscriber. The instructions are further operable to cause the one or more computing devices to, based on the data usage information, select an offering from a plurality of offerings, the offering comprising a service offering or a product offering. The instructions are further operable to cause the one or more computing devices to cause information that identifies the offering to be sent to the device for display.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIG. 2 is a flowchart of a method for implementing subscriber-based real-time service provider offerings according to some examples.

DETAILED DESCRIPTION

Figure 1:
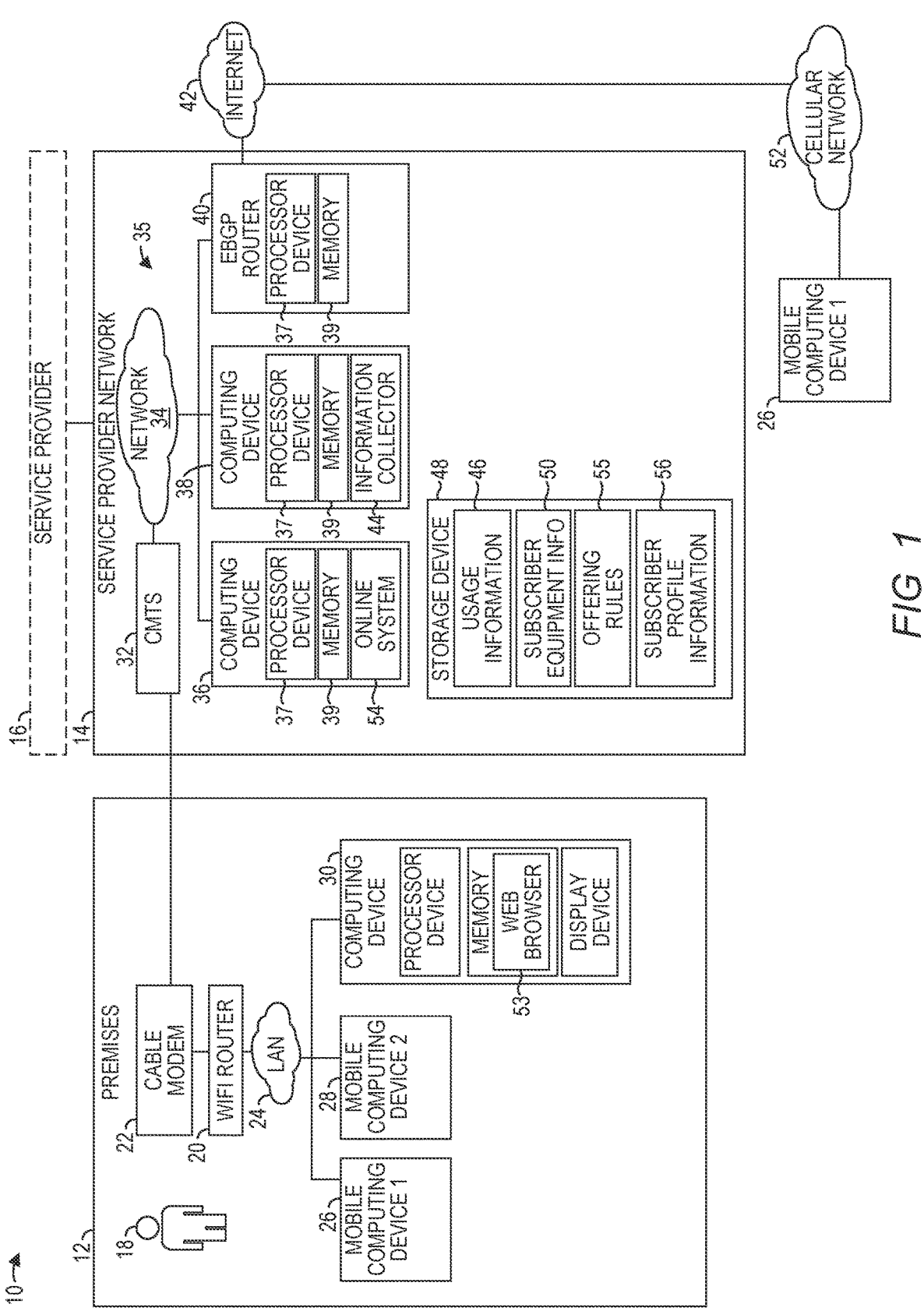
FIG. 1 is a block diagram of an environment in which subscriber-based real-time service provider offerings can be implemented according to some examples.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first message" and "second message," and does not imply an initial occurrence, a quantity, a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified. The word "or" as used herein and in the claims is inclusive unless contextually impossible. As an example, the recitation of A or B means A, or B, or both A and B. The word "data" may be used herein in the singular or plural depending on the context. The use of "and/or" between a phrase A and a phrase B, such as "A and/or B" means A alone, B alone, or A and B together.

Many individuals are not technically savvy and purchase a technology-based product, such as a smartphone or a Wi-Fi® router, or a technology-based service, such as Internet access service or cellular access service, based on limited knowledge. In a situation where the individual may benefit from a different product, such as a faster smartphone, Wi-Fi® router, cable modem, faster internet service, or a different cellular plan, the options are typically numerous, and the individual may not have the technical background to be able to discern which products or services are ideal for the individual.

The examples disclosed herein implement subscriber-based real-time service provider offerings. A service provider stores data usage information relating to a subscriber regarding usage of a local area network of the subscriber and/or usage of a cellular network. The service provider may determine that, based on the data usage information, the subscriber would benefit from a different product than that currently utilized by the subscriber, such as a different smartphone, a different Wi-Fi® router, a different cable modem, or the like. The service provider may also determine that, based on the data usage information, the subscriber would benefit from a different service offering, such as a higher tier or lower tier Internet service plan, a higher tier or lower tier cellular service plan, or the like.

FIG. 1 is a block diagram of an environment 10 in which subscriber-based real-time service provider offerings can be implemented according to some examples. The environment 10 includes customer premises 12, which may be, for example, a house or a business. The environment 10 also includes a service provider network 14 implemented by a service provider 16. The service provider 16 provides services to the customer premises 12, such as internet access services and, in this example, also provides cellular services to a subscriber 18 associated with the customer premises 12. The association may be, for example, that the subscriber 18 lives at the customer premises 12, or in the case of a business, owns or operates the customer premises 12. While only a single customer premises 12 is illustrated, in practice, the service provider 16 may provide services to thousands, hundreds of thousands, or millions of customer premises 12, and the service provider 16 may provide subscriber-based real-time service provider offerings to each of such customer premises.

The customer premises 12 may include a customer premises equipment (CPE) device, such as a Wi-Fi® router 20, which may have been provided by the service provider 16 and/or provisioned via the service provider network 14. The customer premises 12 may also include a CPE device, such as a fiber modem, or, in this example, a cable modem 22. The cable modem 22 may also be provided by the service provider 16 and/or provisioned via the service provider network 14. In this example, the Wi-Fi® router 20 implements a local area network (LAN) 24. One or more subscriber devices may connect to the LAN 24, such as, by way of non-limiting example, a cellular computing device 26 of the subscriber 18 that connects intermittently to the LAN 24 via Wi-Fi®, another cellular computing device 28 that also connects intermittently to the LAN 24 via Wi-Fi®, and a desktop computing device 30 that is relatively constantly connected to the LAN 24 via a wired Ethernet connection. The Wi-Fi® router 20 and/or the cable modem 22 may include a data usage agent that can maintain track of data usage of the computing devices 26, 28 and 30.

A service provider network 34 includes a computing system 35 that comprises one or more computing devices 36 and 38. The service provider network 34 also includes one or more External Border Gateway Protocol (EBGP) routers 40 that facilitate communications with the Internet 42. The computing device 36, the computing device 38, and the EBGP router 40 may each include a processor device 37 and a memory 39. Although for purposes of illustration the computing system 35 is illustrated as having the two computing devices 36 and 38, in practice, the computing system 35 may comprise any number of computing devices.

The LAN 24 is communicatively coupled to the service provider network 14 via the cable modem 22 that communicates with a cable modem termination system (CMTS) 32. The CMTS 32, in turn, is connected to the service provider network 34.

An information collector 44 executes on the computing device 38 and collects, over a period of time, information that is associated with the data usage of the LAN 24. The information may be collected from one or more of the Wi-Fi® router 20, the cable modem 22, and/or the CMTS 32. The information may identify the particular computing device 26, 28, and/or 30 that is using the LAN 24, and the individual upload and download real-time data usage of such computing devices 26, 28, and/or 30, as well as the aggregate upload and download real-time data usage. The information may be provided to the information collector 44 in response to a request from the information collector 44, or may be pushed by one or more of the Wi-Fi® router 20, the cable modem 22, and/or the CMTS 32 in accordance with a desired periodic frequency, such as, by way of non-limiting example, every 10 seconds, every 30 seconds, every minute, or the like. The information collector 44 stores the information as usage information 46 in a storage device 48. The usage information 46 may include the periodic individual data usage information received from the one or more of the Wi-Fi® router 20, the cable modem 22 and/or the CMTS 32. The information collector 44 may also process the usage information 46 and supplement the usage information 46 to include aggregate usage information, such as aggregate and individual device average upload and/or download bandwidth usage over a period of time, such as every minute, every five minutes, every hour, or any other suitable or desirable interval.

The information collector 44 may also collect device information regarding the computing devices 26, 28, and 30, the Wi-Fi® router 20, and the cable modem 22. The Wi-Fi® router 20 may include device identification software, such as, by way of non-limiting example, device identification software available from cujo.com, that can identify types of computing devices 26, 28, and 30 based on information obtained from communications between the computing devices 26, 28, and 30, and the Wi-Fi® router 20. The device information may also include information via which it can be determined that one or more of the particular computing devices 26, 28, and 30 was purchased or leased by the subscriber 18 from the service provider 16, such as a media access control (MAC) address, a unique device identifier, or the like. The information collector 44 may also be able to query the Wi-Fi® router 20 and/or the cable modem 22 to determine the particular models of the Wi-Fi® router 20 and the cable modem 22, or, if provided by the service provider 16 to the subscriber 18, such information may be stored in subscriber equipment information 50 when provided to the subscriber 18.

In this example, the computing device 26 is a smartphone, and when the subscriber 18 is using the computing device 26 at locations other than the premises 12, the computing device 26 may access the Internet 42 via a cellular network 52. The information collector 44 may obtain usage information associated with the computing device 26 utilizing the cellular network 52, such as, by way of non-limiting example, a quantity of data downloaded and/or uploaded, whether the data usage is streaming based or ad-hoc, and the like. The information collector 44 may store such usage information in the usage information 46.

The subscriber 18 may use a web browser 53 to access an online system 54 of the service provider 16. The online system 54 may, for example, be a website of the service provider 16 where the subscriber 18 can obtain information about service and product offerings of the service provider 16, can pay a bill, can obtain support for a problem, or the like. The online system 54, determines that the computing device 30 is accessing the online system 54, such as by receiving a connection request from the computing device 30, or by receiving a request from the computing device 30 for a particular web page of the online system 54. In response, the online system 54 may access the usage information 46 to determine the LAN data usage information of the computing devices 26, 28, and 30, and the cellular data usage of the computing device 26. Based on the data usage information, the online system 54 may determine that the subscriber 18 would benefit from a particular product offering or service offering. In some implementations, the online system 54 may access offering rules 55 that identify a plurality of potential product and service offerings, along with data usage conditions that, if present, result in the selection of a particular product or service offering or offerings from the plurality of product and service offerings.

As an example, the online system 54 may determine, based on the usage information 46, that the computing devices 26, 28, and 30 periodically concurrently attempt to stream video data. The online system 54 accesses subscriber profile information 56 and determines that the current service tier to which the subscriber 18 subscribes is insufficient at times to provide sufficient bandwidth to the computing devices 26, 28 and 30 concurrently. The online system 54 generates user interface imagery that informs the subscriber 18 that the current service tier to which the subscriber 18 subscribes is at times insufficient to provide the quantity of data requested. The online system 54 generates the user interface imagery to also include information offering one or more service offerings of greater bandwidth Internet access plans, or service tiers, based on the offering rules 55, and may include cost information regarding the higher bandwidth service tiers. The online system 54 causes the user interface imagery comprising the service offering to be sent to the computing device 30 for presentation to the subscriber 18.

As another example, the online system 54 may access the subscriber profile information 56 and determine that the current service tier to which the subscriber 18 subscribes is more than sufficient to provide sufficient bandwidth to the computing devices 26, 28, and 30 concurrently, and that a lower service tier would also suffice. The online system 54 generates user interface imagery that informs the subscriber 18 that the current service tier to which the subscriber 18 subscribes may be a higher service tier than is needed. The online system 54, based on the offering rules 55, generates the user interface imagery to also include information offering one or more service offerings of lower bandwidth service tiers, and may include cost information regarding the higher bandwidth service tiers. The online system 54 causes the user interface imagery comprising the service offering to be sent to the computing device 30 for presentation to the subscriber 18.

As another example, the online system 54 accesses the usage information 46 and determines that the computing device 26 frequently streams high-resolution video from the Internet 42. The online system 54 accesses the subscriber equipment information 50 and determines that the computing device 26 is a smartphone that has Wi-Fi® 6 capabilities. The online system 54 accesses the subscriber equipment information 50 and determines that the Wi-Fi® router 20 is not a Wi-Fi® 6 router. The online system 54 generates user interface imagery that informs the subscriber 18 that the computing device 26 is Wi-Fi® 6 capable, that the Wi-Fi® router 20 is not a Wi-Fi® 6 router, and that the computing device 26 would receive a higher bandwidth from a Wi-Fi® 6 router that has a greater Wi-Fi® transfer speed than the Wi-Fi® router 20. The online system 54, based on the offering rules 55, generates the user interface imagery to also include information offering a product offering of a Wi-Fi® 6 router, and may include cost information of one or more Wi-Fi® 6 routers. The online system 54 causes the user interface imagery comprising the product offering to be sent to the computing device 30 for presentation to the subscriber 18.

As another example, the online system 54 accesses the subscriber equipment information 50 and determines that the computing device 26 is a smartphone provided by the service provider 16 and that the computing device 26 obtains cellular service from the service provider 16. The service provider 16 accesses the subscriber equipment information 50 and the subscriber profile information 56 and determines that the computing device 28 is a smartphone that obtains cellular service from another service provider.

The online system 54 generates user interface imagery that informs the subscriber 18 of a service offering wherein the computing device 28 can be added to a family cellular service plan along with the computing device 26. The online system 54 generates the user interface imagery to also include cost information of the family cellular service plan. The online system 54 causes the user interface imagery comprising the service offering to be sent to the computing device 30 for presentation to the subscriber 18.

As another example, the online system 54 accesses the subscriber equipment information 50 and determines that the computing device 26 is a smartphone provided by the service provider 16 and that the computing device 26 obtains cellular service from the service provider 16. The online system 54 accesses the usage information 46 and determines that the subscriber 18 uses the computing device 26 to stream content via the cellular network 52 and that the quantity of content streamed regularly exceeds a monthly allotment included in the current service plan of the subscriber 18, and thus the subscriber 18 pays a premium for data over the monthly allotment. The online system 54 generates user interface imagery that informs the subscriber 18 of a service offering wherein the cellular service plan of the computing device 26 can be changed to a cellular service plan that offers a larger monthly allotment of data and which would eliminate the need for the subscriber 18 to pay a premium for data over the monthly allotment. The online system 54 generates the user interface imagery to also include cost information of the proposed service plan and causes the user interface imagery comprising the cellular service offering to be sent to the computing device 30 for presentation to the subscriber 18.

In some implementations, the online system 54 may utilize current, real time data usage information to select an offering from a plurality of offerings. As an example, the online system 54 determines that the computing device 30 is accessing the online system 54, such as by receiving a connection request from the computing device 30, or by receiving a request from the computing device 30 for a particular web page of the online system 54. In response, the online system 54 requests, from the information collector 44, real time usage information of the LAN 24 and/or the cellular network 52. The information collector 44 communicates with the LAN 24, the cable modem 22, and/or the cellular network 52 to determine real time data usage information. The real time data usage information indicates that currently five computing devices are streaming data on the LAN 24. The online system 54 accesses the offering rules 55. The offering rules 55 indicate that, if fewer than five devices are streaming data on the LAN 24 in real time, the service offering should be at least a service tier that provides a 100 Mbps bandwidth. The offering rules 55 indicate that, if five or more devices are streaming data on the LAN 24 in real time, the service offering should be at least a service tier that provides a 300 Mbps bandwidth. The information collector 44 accesses the subscriber profile information 56 and determines that the current service tier to which the subscriber 18 subscribes provides a 50 Mbps bandwidth. The online system 54 generates user interface imagery that includes information offering a 300 Mbps bandwidth and that may include cost information regarding the service tier. The online system 54 causes the user interface imagery comprising the service offering to be sent to the computing device 30 for presentation to the subscriber 18.

It is noted that, because the online system 54 is a component of the computing system 35, functionality implemented by the online system 54 may be attributed to the computing system 35 generally. Moreover, in examples where the online system 54 comprises software instructions that program the processor device 37 to carry out functionality discussed herein, functionality implemented by the online system 54 may be attributed herein to the processor device 37.

FIG. 2 is a flowchart of a method for implementing subscriber-based real-time service provider offerings according to some examples. FIG. 2 will be discussed in conjunction with FIG. 1. The computing system 35 determines that the subscriber 18 is accessing the online system 54 of the service provider 16 via the computing device 30 (FIG. 2, block 1000). The computing system 35 accesses the usage information 46 associated with the subscriber 18 (FIG. 2, block 1002). The computing system 35, based on the usage information 46, selects an offering from a plurality of offerings, the offering comprising a service offering or a product offering (FIG. 2, block 1004). The computing system 35 causes information identifying the offering to be sent to the computing device 30 for display (FIG. 2, block 1006).

Figure 3:
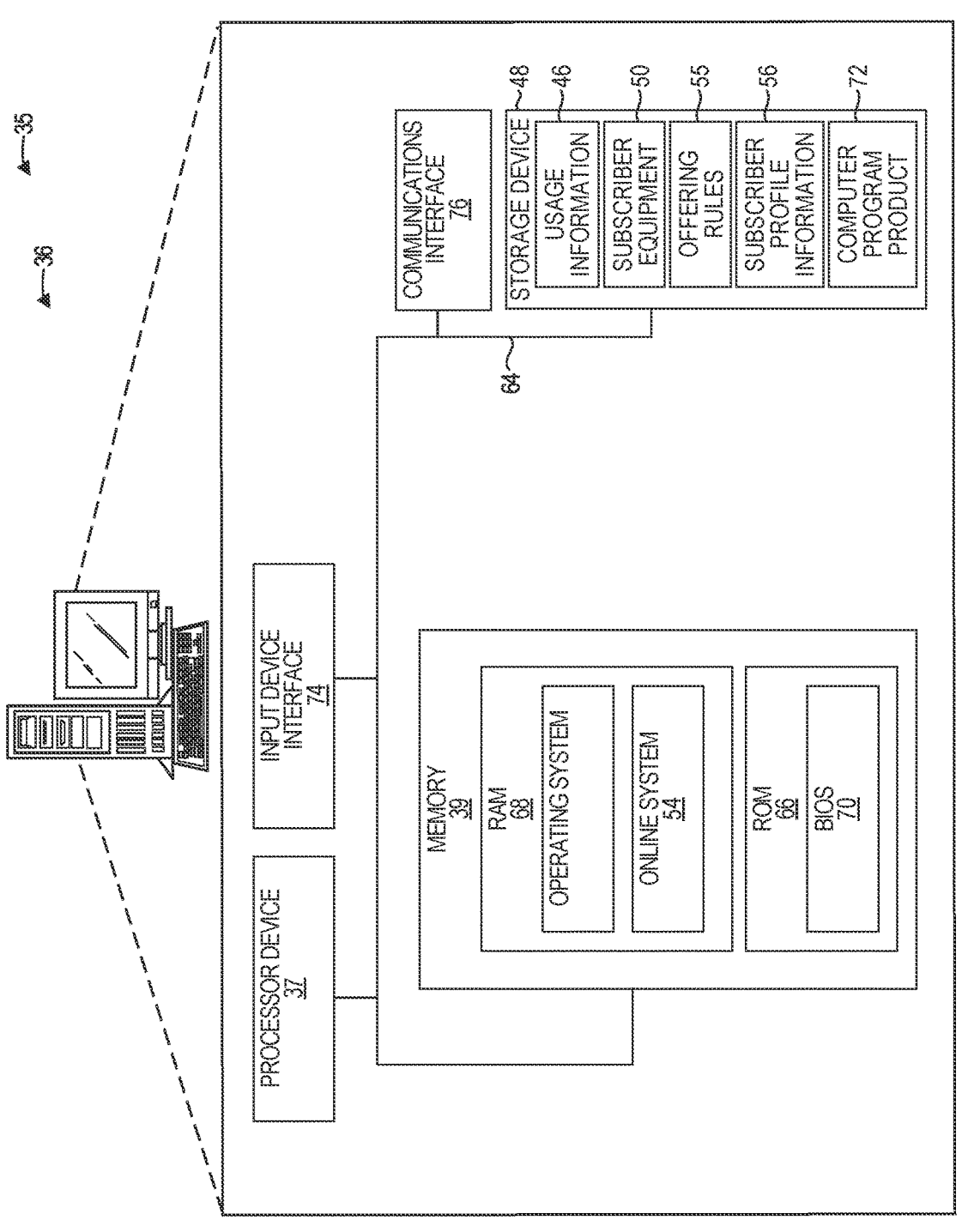
FIG. 3 is a block diagram of a computing system suitable for implementing examples disclosed herein.

FIG. 3 is a block diagram of the computing system 35 suitable for implementing examples disclosed herein. The computing system 35 includes the computing device 36, which may comprise any computing or electronic device capable of including firmware, hardware, and/or executing software instructions to implement the functionality described herein, such as a computer server, or the like. The computing device 36 includes the processor device 37, the system memory 39, and a system bus 64. The system bus 64 provides an interface for system components including, but not limited to, the system memory 39 and the processor device 37. The processor device 37 can be any commercially available or proprietary processor device.

The system bus 64 may be any of several types of bus structures that may further interconnect to a memory bus (with or without a memory controller), a peripheral bus, and/or a local bus using any of a variety of commercially available bus architectures. The system memory 39 may include non-volatile memory 66 (e.g., read-only memory (ROM), erasable programmable read-only memory (EPROM), electrically erasable programmable read-only memory (EEPROM), etc.), and volatile memory 68 (e.g., random-access memory (RAM)). A basic input/output system (BIOS) 70 may be stored in the non-volatile memory 66 and can include the basic routines that help to transfer information between elements within the computing device 36. The volatile memory 68 may also include a high-speed RAM, such as static RAM, for caching data.

The computing device 36 may further include or be coupled to a non-transitory computer-readable storage medium such as the storage device 48, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 48 and other drives associated with computer-readable media and computer-usable media may provide non-volatile storage of data, data structures, computer-executable instructions, and the like.

A number of modules can be stored in the storage device 48 and in the volatile memory 68, including an operating system and one or more program modules, such as the online system 54, which may implement the functionality described herein in whole or in part. All or a portion of the examples may be implemented as a computer program product 72 stored on a transitory or non-transitory computer-usable or computer-readable storage medium, such as the storage device 48, which includes complex programming instructions, such as complex computer-readable program code, to cause the processor device 37 to carry out the steps described herein. Thus, the computer-readable program code can comprise software instructions for implementing the functionality of the examples described herein when executed on the processor device 37. The processor device 37, in conjunction with the online system 54 in the volatile memory 68, may serve as a controller, or control system, for the computing device 36 that is to implement the functionality described herein.

An operator may also be able to enter one or more configuration commands through a keyboard (not illustrated), a pointing device such as a mouse (not illustrated), or a touch-sensitive surface such as a display device. Such input devices may be connected to the processor device 37 through an input device interface 74 that is coupled to the system bus 64 but can be connected by other interfaces such as a parallel port, an Institute of Electrical and Electronic Engineers (IEEE) 1394 serial port, a Universal Serial Bus (USB) port, an IR interface, and the like. The computing device 36 may also include a communications interface 76 suitable for communicating with the service provider network 34 as appropriate or desired.

Individuals will recognize improvements and modifications to the preferred examples of the disclosure. All such improvements and modifications are considered within the scope of the concepts disclosed herein and the claims that follow.

What is claimed is:

1. A method, comprising:

obtaining, by a computing system associated with a service provider that provides Internet access services to a subscriber, over a period of time, local area network (LAN) data usage information that quantifies data usage of a LAN of the subscriber, wherein obtaining the LAN data usage information comprises:

receiving, by the computing system from a router that implements the LAN of the subscriber, the information associated with the data usage on the LAN of the subscriber; and storing, by the computing system, the information associated with the data usage on the LAN of the subscriber;

determining, by the computing system, that a device associated with the subscriber is accessing an online system of the service provider, wherein determining that the device is accessing the online system comprises receiving one of a connection request from the computing device or a request from the computing device for a particular web page of the online system;

in response to determining that the device associated with the subscriber is accessing the online system, accessing, by the computing system, the LAN data usage information associated with the subscriber;

based on the LAN data usage information, selecting, by the computing system, an offering from a plurality of offerings, the offering comprising a service offering or a product offering; and causing, by the online system, information that identifies the offering to be sent to the device for display.

2. The method of claim 1, further comprising:

accessing, by the computing system, subscriber equipment information that identifies a customer premises equipment (CPE) device of the subscriber; and wherein, based on the data usage information, selecting, by the computing system, the offering from the plurality of offerings further comprises based on the data usage information and the CPE device of the subscriber, selecting, by the computing system, the offering from the plurality of offerings.

3. The method of claim 1, wherein the offering comprises an internet access plan having a greater bandwidth than a bandwidth of a current internet access plan of the subscriber.

4. The method of claim 1, wherein the offering comprises a Wi-Fi® router having a greater transfer speed than a current Wi-Fi® router of the subscriber.

5. A computing system, comprising:

one or more computing devices operable to:

obtain, over a period of time, local area network (LAN) data usage information that quantifies data usage of a LAN of a subscriber, wherein the computing system is associated with a service provider that provides Internet access services to the subscriber, and wherein obtaining the LAN data usage information comprises:

receiving, from a router that implements the LAN of the subscriber, the information associated with the data usage on the LAN of the subscriber; and storing the information associated with the data usage on the LAN of the subscriber;

determine that a device associated with the subscriber is accessing an online system of the service provider, wherein determining that the device is accessing the online system comprises receiving one of a connection request from the computing device or a request from the computing device for a particular web page of the online system;

in response to determining that the device associated with the subscriber is accessing the online system, access the LAN data usage information associated with the subscriber;

based on the LAN data usage information, select an offering from a plurality of offerings, the offering comprising a service offering or a product offering; and cause information that identifies the offering to be sent to the device for display.

6. The computing system of claim 5, wherein the one or more computing devices are further operable to:

access subscriber equipment information that identifies a customer premises equipment (CPE) device of the subscriber; and wherein, to select the offering from the plurality of offerings, the one or more computing devices are further operable to, based on the data usage information and the CPE device of the subscriber, select the offering from the plurality of offerings.

7. A non-transitory computer-readable storage medium that includes executable instructions operable to cause one or more computing devices of a computing system to:

obtain, over a period of time, local area network (LAN) data usage information that quantifies data usage of a LAN of a subscriber, wherein the computing system is associated with a service provider that provides Internet access services to the subscriber, and wherein obtaining the LAN data usage information comprises:

receiving, from a router that implements the LAN of the subscriber, the information associated with the data usage on the LAN of the subscriber; and storing the information associated with the data usage on the LAN of the subscriber;

determine that a device associated with the subscriber is accessing an online system of the service provider, wherein determining that the device is accessing the online system comprises receiving one of a connection request from the computing device or a request from the computing device for a particular web page of the online system;

in response to determining that the device associated with the subscriber is accessing the online system, access the LAN data usage information associated with the subscriber;

based on the LAN data usage information, select an offering from a plurality of offerings, the offering comprising a service offering or a product offering; and cause information that identifies the offering to be sent to the device for display.

* * * * *